(12) United States Patent
Mitsukawa et al.

(10) Patent No.: US 8,096,114 B2
(45) Date of Patent: Jan. 17, 2012

(54) CATALYST ARRANGEMENT CONSTRUCTION OF MOTORCYCLE

(75) Inventors: Makoto Mitsukawa, Wako (JP); Koichiro Honda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 525 days.

(21) Appl. No.: 12/332,710

(22) Filed: Dec. 11, 2008

(65) Prior Publication Data

US 2009/0165448 A1 Jul. 2, 2009

(30) Foreign Application Priority Data

Dec. 27, 2007 (JP) ................................ 2007-336597

(51) Int. Cl.
*F01N 3/10* (2006.01)
(52) U.S. Cl. ........................................... 60/299
(58) Field of Classification Search ....................... 60/299
See application file for complete search history.

(56) References Cited

U.S. PATENT DOCUMENTS

| | | | | |
|---|---|---|---|---|
| 5,360,081 A | * | 11/1994 | Takegami | 180/309 |
| 5,972,299 A | * | 10/1999 | Huang et al. | 422/173 |
| 6,647,714 B1 | * | 11/2003 | Gerber | 60/313 |
| 7,290,388 B2 | * | 11/2007 | Kikuchi et al. | 60/323 |
| 2002/0112470 A1 | * | 8/2002 | Yamada et al. | 60/290 |
| 2005/0081664 A1 | * | 4/2005 | Kawakubo et al. | 74/337.5 |
| 2006/0266026 A1 | * | 11/2006 | Kato et al. | 60/324 |
| 2007/0102896 A1 | * | 5/2007 | Shinsho et al. | 280/274 |
| 2007/0200439 A1 | * | 8/2007 | Nagahashi et al. | 310/54 |
| 2007/0221160 A1 | * | 9/2007 | Haze et al. | 123/197.1 |

FOREIGN PATENT DOCUMENTS

| | | |
|---|---|---|
| EP | 1 826 112 A1 | 8/2007 |
| FR | 2 860 035 A1 | 3/2005 |
| JP | 2-163407 A | 6/1990 |
| JP | 2885343 B2 * | 2/1999 |
| JP | 2006-226279 A | 8/2006 |
| JP | 2006226279 A * | 8/2006 |
| WO | 2006/120834 A1 | 11/2006 |

* cited by examiner

*Primary Examiner* — Thomas Denion
*Assistant Examiner* — Jason Shanske
(74) *Attorney, Agent, or Firm* — Westerman, Hattori, Daniels & Adrian, LLP

(57) ABSTRACT

An engine has a crankcase, and a cylinder which extends from an upper portion of the crankcase toward a front side. In a space which is formed at an upper side of a horizontal plane which substantially horizontally extends from a bottom surface of the crankcase, a catalyst storage chamber is arranged in such a manner that an axis of the catalyst converter is in a direction of a crankshaft. The space is arranged just below a front surface of the cylinder and forward of a front surface of the crankcase.

12 Claims, 12 Drawing Sheets

CATALYST ARRANGEMENT CONSTRUCTION OF MOTORCYCLE

TECHNICAL FIELD

The present invention relates to a catalyst arrangement construction of a motorcycle having a catalyst storage chamber in an exhaust pipe between an exhaust port and an exhaust muffler of an engine.

BACKGROUND OF THE INVENTION

In a motorcycle where a single-cylinder engine of a small engine displacement is mounted, an exhaust pipe extends from the engine to a lower side of a crankcase and a catalyst converter is connected with the exhaust pipe at the lower side of the crankcase. Moreover, an outlet of the catalyst converter is connected to an exhaust muffler of a rear portion of the vehicle through another exhaust pipe. The motorcycle having the above-described construction has been disclosed (with reference to JP-A No. 2006-226279, for example).

In this motorcycle, exhaust gas which has a high temperature and is exhausted from the engine is supplied to a catalyst in the catalyst converter before the exhaust gas reaches the exhaust muffler. Therefore, the exhaust gas having a higher temperature is supplied to the catalyst and the temperature of the catalyst can be rapidly raised to an activation temperature, as compared with the case where the catalyst is arranged in the exhaust muffler.

In the vehicle where the single-cylinder engine of the relatively small engine displacement is mounted as described in JP-A No. 2006-226279, the catalyst is small so that the catalyst converter in which the catalyst is stored is also small. Therefore, the ground clearance from the ground to the catalyst converter can be sufficiently ensured even when the catalyst converter is arranged at the lower side of the crankcase.

However, in the vehicle where the engine of a moderate engine displacement is mounted, because the catalyst becomes large to be proportional to the engine displacement, the catalyst converter also becomes large. At the lower side of the crankcase, there is no empty space where the catalyst converter can be arranged to ensure the ground clearance. Therefore, in this kind of vehicle, the catalyst converter with the relatively large capacity cannot be arranged compactly.

Here, it is an object of the present invention to provide a catalyst arrangement construction of a vehicle such as a motorcycle where a compact arrangement is available while a lowest ground clearance can be ensured to address problems of the above-described related art.

SUMMARY OF THE INVENTION

In order to solve the above-described problems, according to the present invention, a catalyst arrangement construction of a motorcycle has a catalyst storage chamber in an exhaust pipe between an exhaust port and an exhaust muffler of an engine. The engine has a crankcase, and a cylinder which extends from an upper portion of the crankcase toward a front side of the vehicle. In a space which is formed at an upper side of a horizontal plane which substantially horizontally extends from a bottom surface of the crankcase, the catalyst storage chamber is arranged in such a manner that an axis of the catalyst storage chamber is parallel to an axis of the crankshaft. The space is further defined by a lower side of a front surface of the cylinder of the engine and a front side of a front surface of the crankcase.

According to the present invention, because the catalyst storage chamber is arranged in the space which is the lower side of the front surface of the cylinder of the engine and the front side of the front surface of the crankcase and is formed at the upper side of the horizontal plane which substantially horizontally extends from the bottom surface of the crankcase in such a manner that the axis of the catalyst storage chamber is parallel to the axis of the crankshaft, the catalyst converter can be compactly arranged while a lowest ground clearance is ensured, and the empty space which is surrounded by the cylinder and the crankcase of the engine is effectively used.

The engine is a parallel multiple-cylinder engine. The catalyst storage chamber is preferably arranged within a width of the cylinder of the engine in a body width direction. According to this construction, because the catalyst storage chamber is arranged within the width of the cylinder of the parallel multiple-cylinder engine, the catalyst storage chamber is arranged just below the cylinder. Therefore, even in a cold engine condition after starting the engine, a catalyst can be rapidly activated by the heat of the cylinder.

More preferably, a plurality of exhaust pipes which are connected to the cylinder of the engine respectively extend from the cylinder to a lower side of the body and are combined into a single pipe which connects to the catalyst storage chamber. According to this construction, because the plurality of exhaust pipes which are connected with the cylinder of the engine are connected to the catalyst storage chamber, the whole exhaust unit can be compactly constructed.

More preferably, a body function component is arranged at a front side of the cylinder. The catalyst storage chamber may be arranged in a space is further defined by a rear surface of the body function component. According to this construction, because the catalyst storage chamber is arranged at a rear side of the body function component, cooling of the catalyst converter due to traveling wind can be restricted by the body construction member while the space to the rear side of the body function component is effectively used.

More preferably, a partition wall for partitioning an interior of the catalyst storage chamber into a plurality of expansion chambers and a plurality of communication pipes which penetrate the partition wall are provided. The catalyst body may be arranged at one of the communication pipes. According to this construction, because the partition wall for partitioning the interior of the catalyst storage chamber into the plurality of expansion chambers and the plurality of communication pipes which penetrate the partition wall are provided, the catalyst storage chamber also functions as a silencer and the whole exhaust unit can be further compactly constructed. Thus, the degree of freedom in layout of the exhaust muffler is also improved.

More preferably, a detachable oil filter which is arranged at a front side of the crankcase is provided. The catalyst storage chamber may be arranged to an upper side of the oil filter. According to this construction, because the catalyst storage chamber is arranged to the upper side of the oil filter, a detachment operation of the oil filter can be readily performed. Furthermore, the body function component is the fuel tank, and the catalyst storage chamber is arranged at the rear side of the fuel tank which is a component with a large size among the body function components. Therefore, the exposure of the catalyst storage chamber to the traveling wind can be restricted.

In this invention, because the catalyst storage chamber is arranged in the space which is defined by the lower side of the front surface of the cylinder of the engine, the front side of the front surface of the crankcase and the upper side of the horizontal plane which substantially horizontally extends from the bottom surface of the crankcase in such a manner that the axis of the catalyst storage chamber is in the crankshaft direction, the catalyst storage chamber can be compactly arranged while a low ground clearance is ensured.

Moreover, because the catalyst storage chamber is arranged within the width of the cylinder of the parallel multiple-cylinder engine in the body width direction, the catalyst can be rapidly activated by the heat of the cylinder even in a cold engine condition after starting the engine.

Furthermore, because the plurality of exhaust pipes which are connected to the cylinder of the engine are combined before being connected to the catalyst storage chamber, the whole exhaust unit can be compactly constructed.

Moreover, because the catalyst storage chamber is arranged at the rear side of the body function component, cooling of the catalyst converter due to the traveling wind can be restricted by the body construction member while the space to the rear side of the body function component is efficiently used.

Furthermore, because the partition wall for partitioning the interior of the catalyst storage chamber into the plurality of expansion chambers and the plurality of communication pipes which penetrate the partition wall are provided, the catalyst storage chamber also functions as a silencer and the whole exhaust unit can be further compactly constructed.

Furthermore, because the catalyst storage chamber is arranged at the upper side of the oil filter, the detachment operation of the oil filter can be readily performed.

Furthermore, because the catalyst storage chamber is arranged at the rear side of the fuel tank which is a component with a large size among the body function components, the exposure of the catalyst storage chamber to the traveling wind can be restricted.

BRIEF DESCRIPTION OF THE DRAWINGS

The advantages of the invention will become apparent in the following description taken in conjunction with the drawings, wherein.

DETAILED DESCRIPTION OF THE INVENTION

Next, embodiments of the present invention will be described with reference to drawings. In the following explanation, the description of the front-rear direction, the left-right direction, and the up-down direction follows the direction when being viewed by a rider. Moreover, the arrow FR, the arrow R, and the arrow UP in drawings respectively represent the vehicle front side, the vehicle right side and the vehicle upper side.

Figure 1:
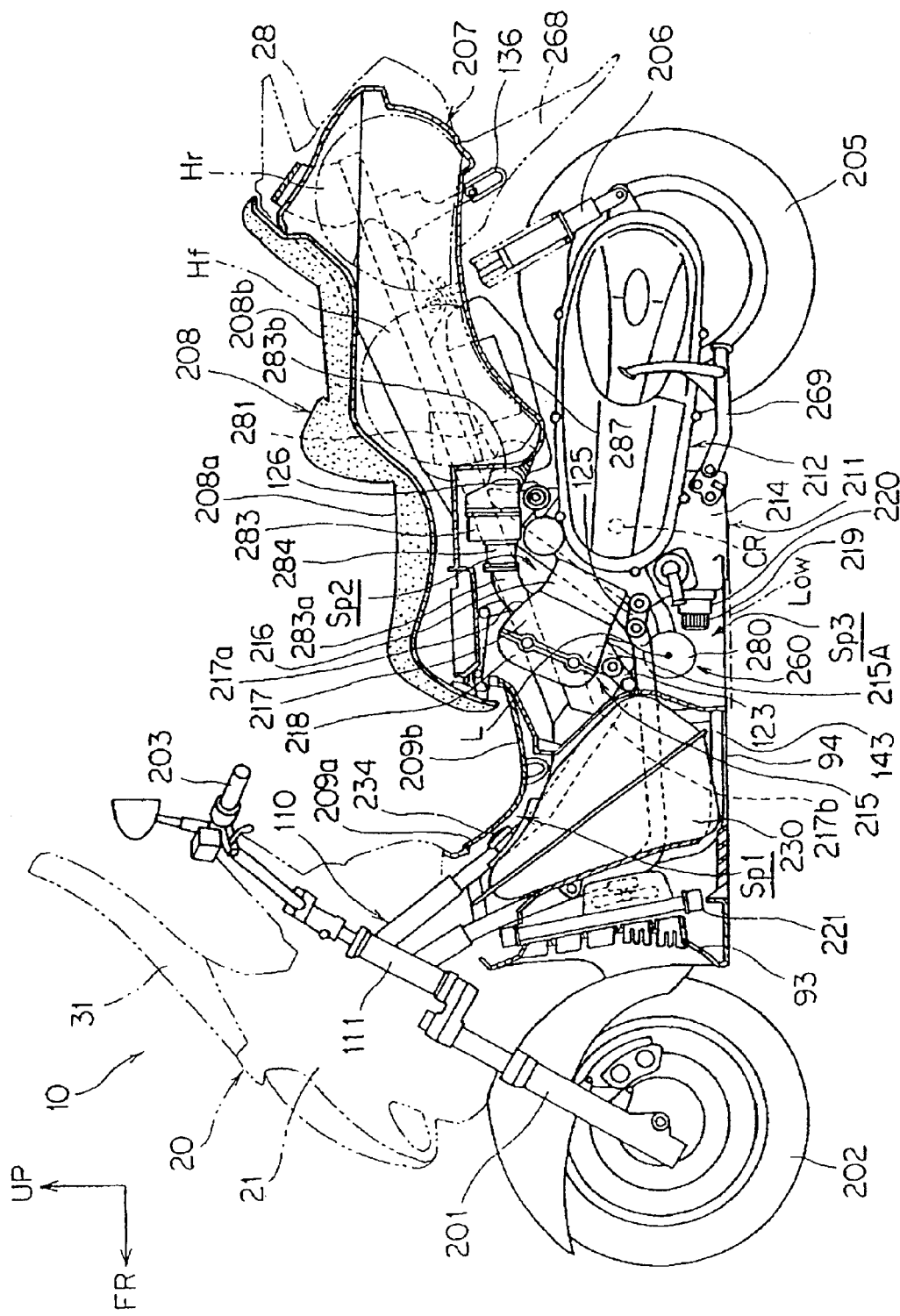
FIG. 1 is a side view which shows a motorcycle according to a first embodiment.
Figure 2:
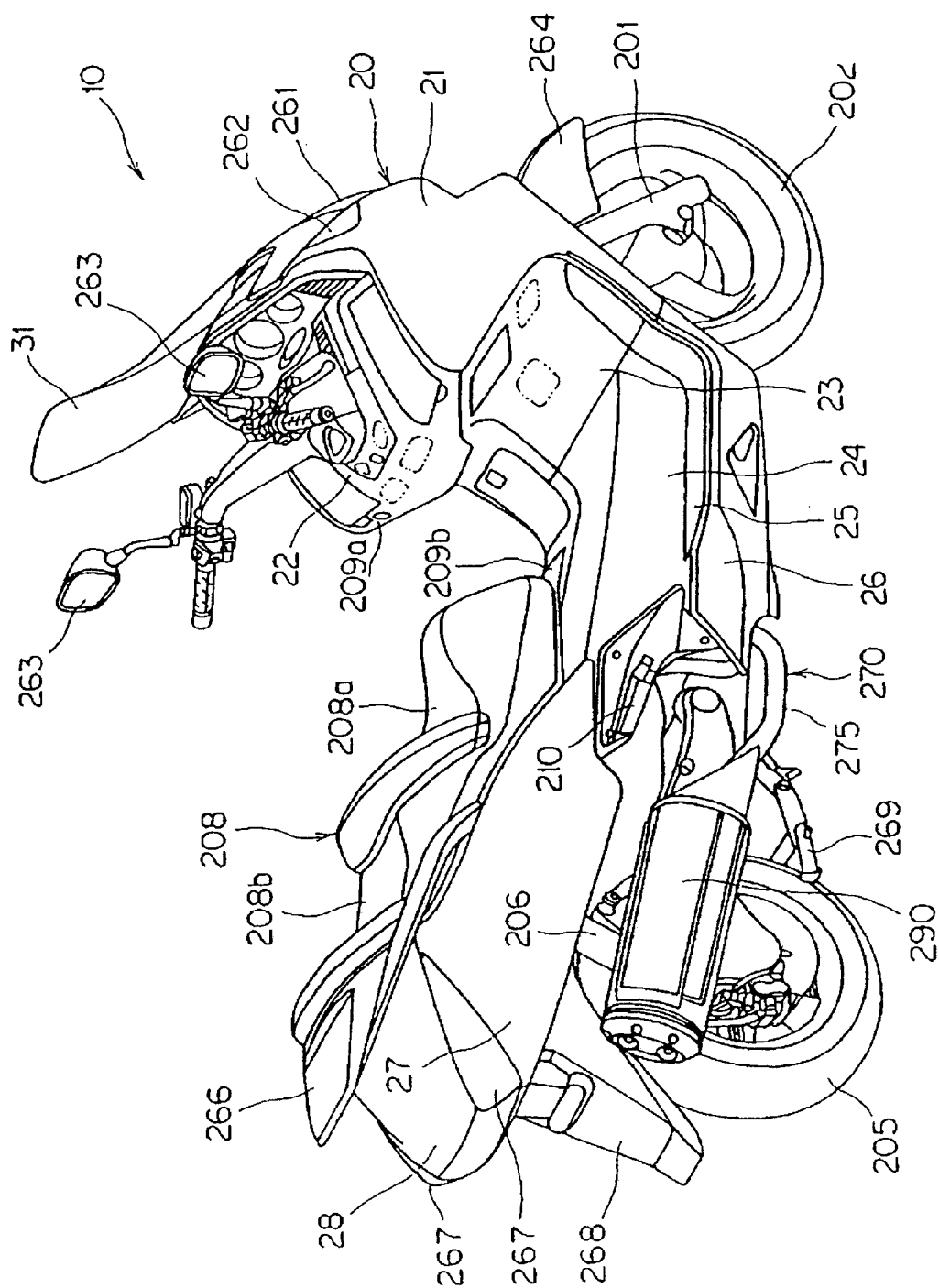
FIG. 2 is a perspective view when the motorcycle is viewed from a slant rear portion of a right side.

FIG. 1 is a side view of a motorcycle according to a first embodiment, and FIG. 2 is a perspective view when being viewed from a slant rear portion of the right side of the motorcycle. A motorcycle 10 is a vehicle of a scooter type which has a floor 25 of a low-floor type (with reference to FIG. 2).

As shown in FIG. 1, the motorcycle 10 has a body frame 110, a pair of right and left forks 201, 201 which are rotatably supported at a head pipe 111 of the body frame 110, a front wheel 202 which is rotatably supported at the front forks 201, 201, a handlebar 203 for steering which is connected to the front forks 201, 201, an engine 211 which is supported at a rear portion of the body frame 110, a power transmission mechanism 212 which is swingable, independent of the engine 211, in the up-down direction with a crankshaft CR of the engine 211 as a center, a rear wheel 205 which is supported at a rear portion of the power transmission mechanism 212, a pair of right and left rear cushion units 206, 206 which are mounted between the body frame 110 and the power transmission mechanism 212, a storage box 207 which is mounted at the upper side of the rear portion of the body frame 110, and a seat 208 which is openably and closably arranged at the upper side of the storage box 207.

As shown in FIG. 2, the motorcycle 10 is covered by a body cover 20. The body cover 20 covers the front portion of the body frame 110. The body cover 20 includes a front cowl 21 which has a wind screen 31 at the upper portion thereof, an upper cover 22 which covers the upper portion of the rear side of the front cowl 21, an inner cover 23 which covers the lower portion of the rear side of the front cowl 21, a center cover 24 which extends out from the rear end of the inner cover 23 to the rear side to cover the middle of the width direction of the body frame 110, a floor 25 of a low-floor type which extends out from the outer edge of the lower end of the center cover 24 to the outer side to carry feet of a rider, a floor skirt 26 which extends from the outer edge of the floor 25 to the lower side, a pair of right and left rear side covers 27 which extend from the center cover 24 to the rear side to cover the rear side portion of the body frame 110, and a rear cover 28 which covers the rear portion of the body frame 110.

The seat 208 is an all-in-one seat having a seat front portion 208a at which the rider sits, and a seat rear portion 208b at which an occupant sits. The seat front portion 208a and the seat rear portion 208b are integrated. A pillion step 210 on which the occupant sitting at the seat rear portion 208b puts his or her feet is storably and exposably arranged at the lower side of the front portion of the rear side cover 27. In drawings, 261 is a head lamp, 262 is a turn signal, 263, 263 are mirrors, 264 is a front fender, 265 is a lock for locking the seat, 266 is a rear air spoiler, 267 is a tail lamp, 268 is a rear fender, 269 is a main kickstand, 209a is a lid for fueling which exposably opens/closes a fueling port 234 of a fuel tank 230 (with reference to FIG. 1), and 209b is a lid for checking an ignition plug (not shown) of the engine 211 when opened.

Figure 3:
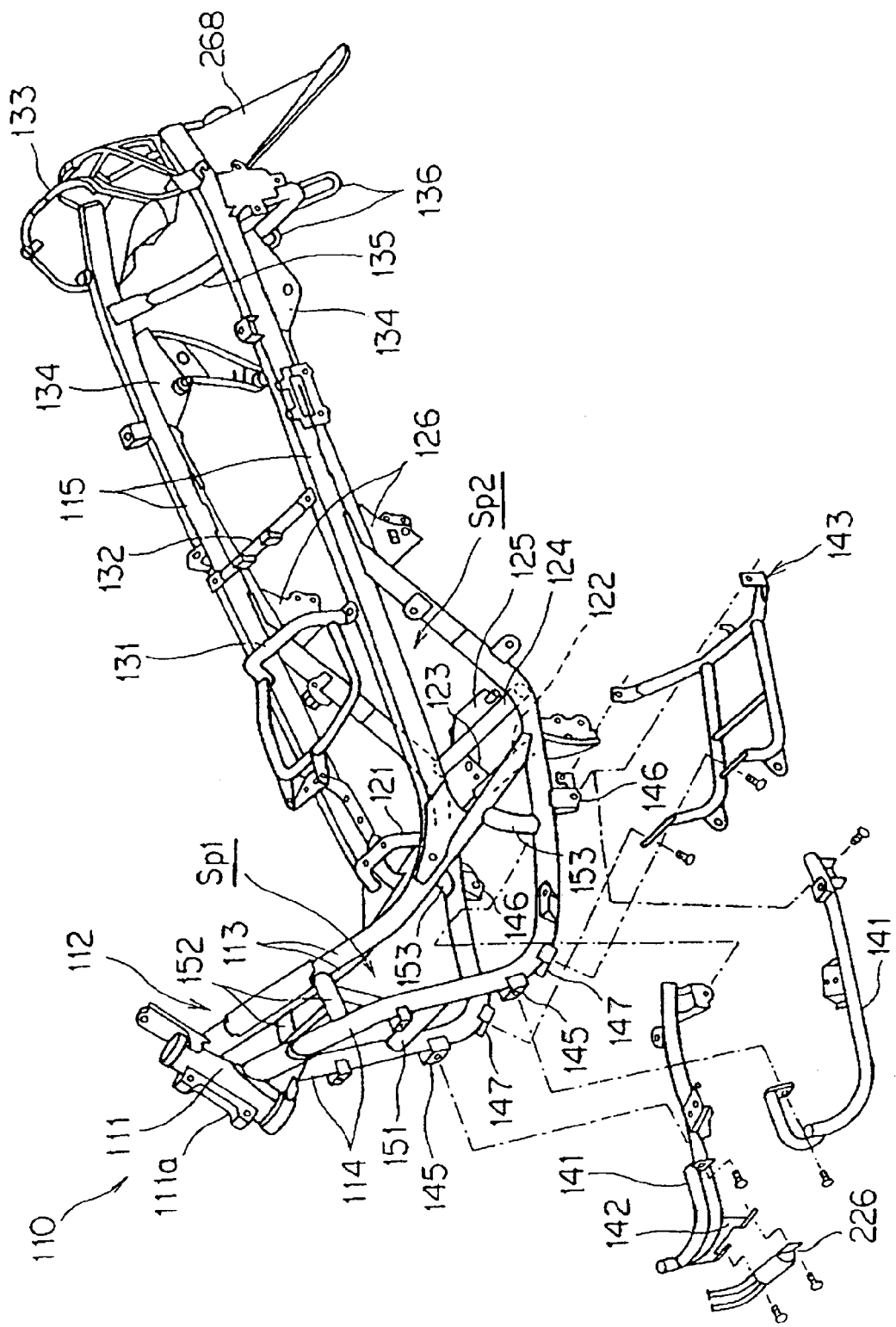
FIG. 3 is a view which shows a body frame.

FIG. 3 shows the body frame 110. The body frame 110 is an all-in-one frame of a double cradle type where a front frame 112 which is connected to the head pipe 111 and extends downward to the rear by welding, and is connected to a pair of right and left rear frames 115, 115 (which are also named seat rails) which extend upward to the rear from the rear portion of the front frame 112 by welding. The head pipe 111 has a bracket 111a for fixing a cowl stay, which supports the body cover 20 (the front cowl 21 and the like).

The front frame 112 has a pair of right and left upper frames 113, 113 which extend from the head pipe 111 to the rear lower side, and a pair of down tubes 114, 114 which is arranged below the pair of upper frames 113, 113 and extends downwards from the head pipe 111. The pair of down tubes 114, 114 is bent halfway and substantially horizontally extends toward the rear side to be combined with the rear ends of the pair of upper frames 113, 113. Thereafter, the pair of down tubes extends upward to the rear to be combined with the pair of rear frames 115, 115.

Due to the front frame 112 having such construction, a space Sp1 which is encircled by the upper frames 113, 113 and the down tubes 114, 114 is formed to have a truss structure which has a substantial triangular shape in a side view thereof. Moreover, between the frames which construct the front frame 112, cross members 151, 121 and 122 are laid in the width direction, and reinforcement members 152, 152, 153 and 153 are laid. Thus, the sufficient frame rigidity can be ensured.

As shown in FIG. 3, a fuel tank 230 is arranged in the space Sp1. In order to effectively use the space Sp1 for arrangement, the fuel tank 230 is formed into a container having a substantially triangular shape which is tapered upward to the front along the upper frames 113, 113 and the down tubes 114, 114 when being viewed from the body side. Moreover, the lower portion of the fuel tank 230 expands lower than the down tubes 114, 114 and the lower portion of the fuel tank 230 is covered by an under frame 143 which is detachable and positioned below the down tubes 114 to protect the fuel tank 230. Therefore, the fuel tank 230 has a shape to increase the capacity thereof and lower center of gravity, so that the center of gravity of the motorcycle 10 can be lowered.

Furthermore, a radiator 221 for cooling the engine is fixed by bolts to the down tubes 114, 114 in such a manner that the radiator 221 is positioned at the front side of the fuel tank 230, and right and left floor supporting stays 141, 141 which support the floor 25 (with reference to FIG. 1) are fixed by bolts to portions of the down tubes 114, 114, which substantially horizontally extend downward. An engine ignition coil 226 is fixed to the lower portion of the front end of the floor supporting stays 141, 141.

In FIG. 3, reference numerals 145 and 146 are brackets for bolting down the floor supporting stays 141, 141 to the down tubes 114, 114. The brackets 146 are also used as brackets for bolting down the under frame 143. The under frame 143 is bolted down to the brackets 146 and brackets 147.

In the body frame 110, as shown in FIG. 1, the engine 211 is supported at the rear side of the fuel tank 230 and a storage box 207 which extends over the front-rear direction is supported between the pair of right and left rear frames 115, 115 which extend in the front-rear direction above the engine 211. Because the storage box 207 has a long box shape in the front-rear direction of the body, a storage space having a large capacity which can house two helmets Hf and Hr is ensured.

As shown in FIG. 3, the right and left rear frames 115, 115 are members having a vertically longer cross sectional shape such that one end of each of the rear frames is coupled to each of the halfway portions of the longitudinal direction of the pair of right and left upper frames 113, 113 and other end of each of the rear frame extends rearward. Specifically, the rear frames 115, 115 are constructed of square pipes which have a cross section with a vertically longer rectangle shape. In this case, "the vertically longer cross sectional shape" means a cross section shape which has a larger longitudinal size than a lateral size thereof.

A first cross member 121 is laid between the front ends of the right and left rear frames 115, 115. A second member 131, a third cross member 132 and a fourth cross member 133 are laid from the front side in sequence behind the first cross member 121. The three cross members 131-133 overlap the upper surfaces of the rear frames 115, 115 and are bolted down. Furthermore, brackets 134, 134 for the cushions are combined with the rear portions of the right and left rear frames 115, 115. A cross member 135 is laid between the rear portions of the rear frames 115, 115. By the plurality of cross members 121, 131-133, 135, the frame rigidity is sufficiently ensured. Moreover, right and left hooks 136, 136 for conveying are combined with the fifth cross member 135.

As shown in FIG. 3, the body frame 110 has a sixth cross member 122 which is laid between the lower ends of the right and left upper frames 113, and a seventh cross member 124 which is laid between the rear portions of the horizontal parts of the down tubes 114, 114. Brackets 123, 125 and 126 for the engine are respectively arranged at the rear ends of the cross members 122, 124 and the down tubes 114, 114, and the engine 211 is supported through the brackets 123, 125 and 126 used for the engine.

Figure 4:
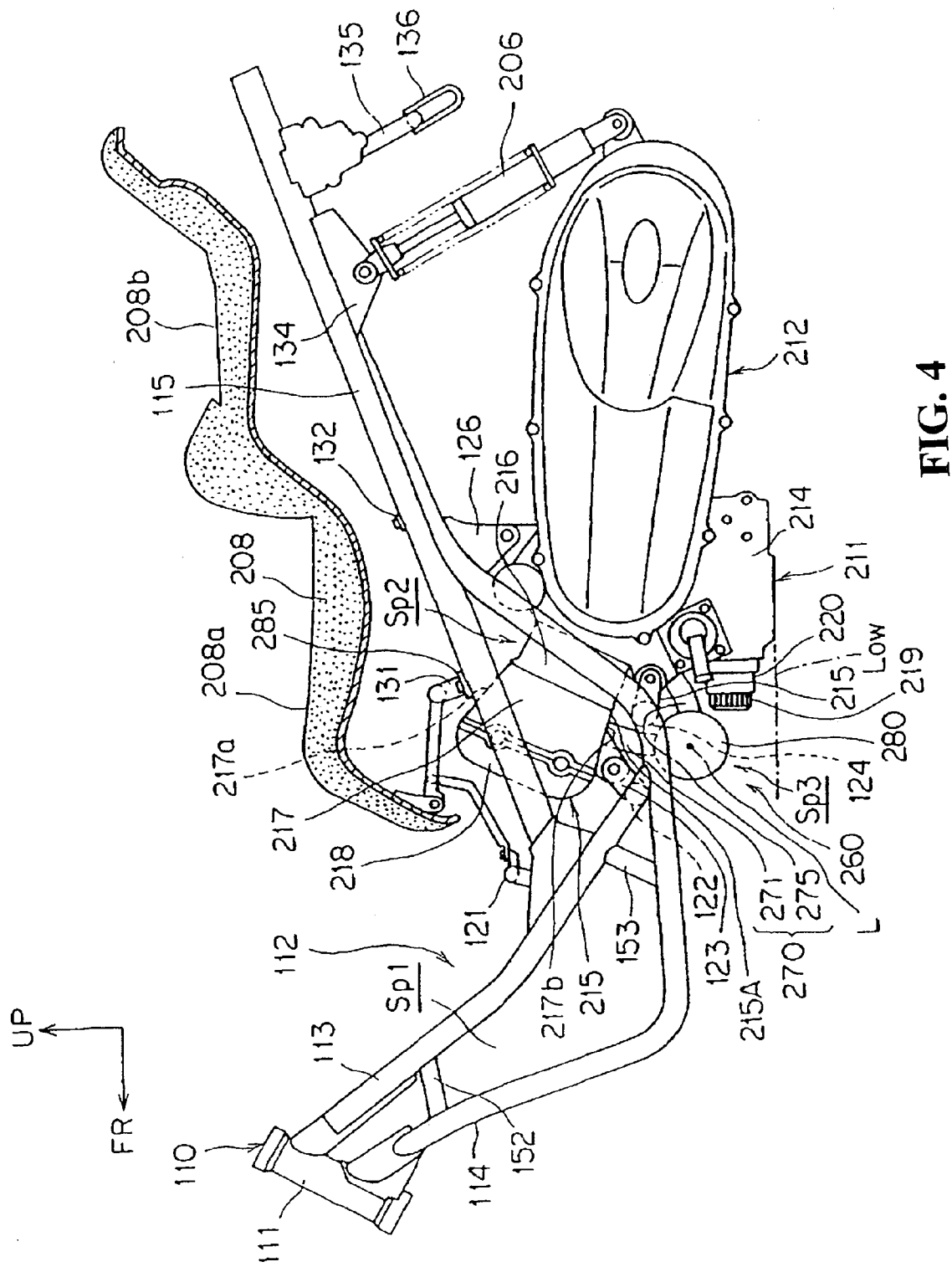
FIG. 4 is a view which shows a state where an engine is supported by the body frame.

FIG. 4 shows the state where the engine 211 is supported by the body frame 110.

The engine 211 has a crankcase 214 and a forwardly tilted cylinder 215 which extends from the upper portion of the crankcase 214 to the front side. The cylinder 215 has a cylinder block 216 which is connected with the crankcase 214, a cylinder head 217 which is connected with the front portion of the cylinder block 216 and a head cover 218 which is connected with the front portion of the cylinder head 217. The engine 211 is, for example, a water-cooled parallel two-cylinder engine (parallel multiple-cylinder engine) where two right and left pistons P (FIG. 5) are housed slidably in the substantial front-rear direction in the cylinder block 216.

In the engine 211, a lower portion of the cylinder 215 is attached to the first bracket 123 for the engine, a front portion of the crankcase 214 is attached to the second bracket 125 for the engine, and a rear portion of the crankcase 214 is attached to the third brackets 126, 126 for the engine. Thus, a cylinder 215 is positioned in the space Sp2 which has a substantially triangular shape in the side view thereof and is surrounded by the pair of upper frames 113, the down tube 114 and the rear frame 115, and the engine 211 is supported by the body frame 110 in a layout where the lower portion of the crankcase 214 is suspended at the lower side of the down tubes 114, 114. A crankshaft CR, which is connected with the piston through a connecting rod extends in the engine width direction (width direction of the body) to be journaled to the crankcase 214. The rotation of the crankshaft CR is transmitted to the power transmission mechanism 212. The power transmission mechanism 212 is, for example, constructed of a belt converter continuously variable transmission with a centrifugal clutch which transmits the rotation of the crankshaft CR to the rear wheel 205.

Multiple (two in this embodiment) air suction ports 217a used for the cylinders are opened in the upper surface of the cylinder head 217 of the engine 211, and multiple (two in this embodiment) exhaust ports 217b used for the cylinders are opened in the lower surface of the cylinder head 217. As shown in FIG. 1, a throttle body 283 and an air cleaner 281, which construct an air suction system of the engine 211, are arranged above the engine 211 and the power transmission mechanism 212. The throttle body 283 is connected to the air suction port 217a through an inlet pipe 283a. The air cleaner 281 is connected to the rear side of the throttle body 283 through a connecting tube 283b. The air cleaner 281 is arranged at the right side of the storage box 207, and a battery 287 is arranged at the left side of the storage box 207. Moreover, an exhaust unit 260 which constructs the exhaust system of the engine 211 is connected with the exhaust port 217*b*.

Figure 5:
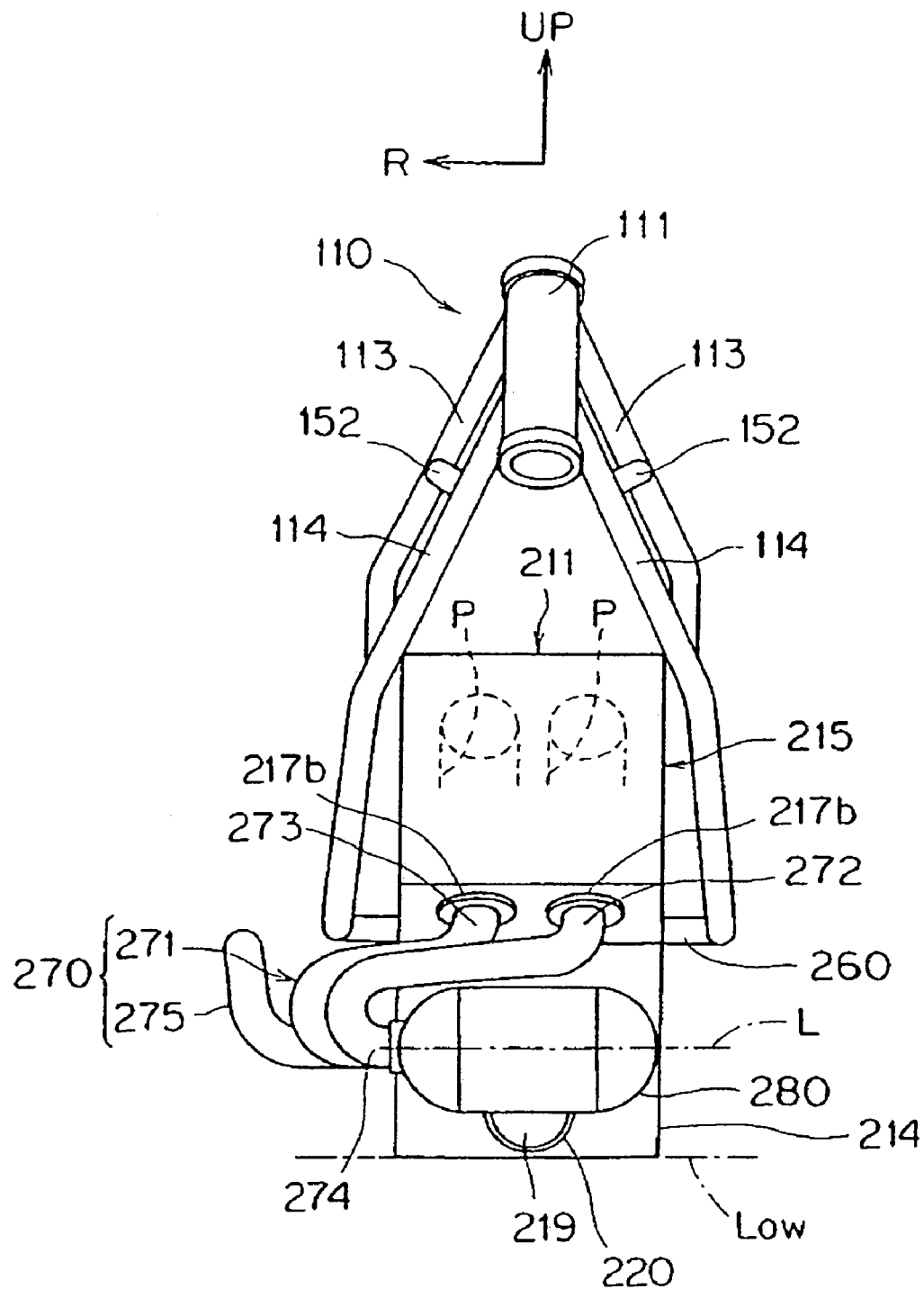
FIG. 5 is a front view which shows the engine along with a periphery construction thereof.

FIG. 5 is a front view which shows the engine 211 along with the periphery construction thereof.

The exhaust unit 260 has an exhaust pipe 270, a catalyst converter 280 (catalyst storage chamber) and an exhaust muffler 290 (with reference to FIG. 2). The exhaust pipe 270 constructs an exhaust passage which connects an exhaust port 217*b* with the exhaust muffler 290 of the engine 211. The exhaust muffler 290 is arranged at the right side of the rear wheel 205, that is, at the right side of the rear portion of the body.

As shown in FIG. 5, the exhaust pipe 270 has a front exhaust pipe 271 which extends from the exhaust ports 217*b* of the engine 211 to be connected with the catalyst converter 280 at the lower portion of the front surface (which is named cylinder front surface 215A) of the cylinder 215 of the engine 211 and the front side of the crankcase 214, and a rear exhaust pipe 275 which extends from the catalyst converter 280 to the rear portion of the body to be connected with the exhaust muffler 290. The upstream side (exhaust inlet side) of the front exhaust pipe 271 branches to branch exhaust pipes 272 and 273 which have the number equal to that of the exhaust ports 217*b*. The front exhaust pipe 271 is a metal pipe where the downstream sides (exhaust outlet sides) of the branch exhaust pipes 272 and 273 are gathered into one piece. The branch exhaust pipes 272 and 273 sandwich a gasket which is not shown therebetween, and are respectively connected with the exhaust ports 217*b*, 217*b* of the cylinder head 217.

After the branch exhaust pipes 272 and 273 bend to the right side of the body while extending from the exhaust ports 217*b*, 217*b* to the lower side, the exhaust pipes 272 and 273 become one exhaust pipe. This one exhaust pipe 274 bends to the middle of the body width to be connected with the right side of the catalyst converter 280. As shown in FIG. 5, among the branch exhaust pipes 272 and 273, the branch exhaust pipe 272 connected with the exhaust port 217*b* (left exhaust port) is formed into a pipe shape which is connected to the connection portion such that the branch exhaust pipe 272 takes a substantially shortest path from the exhaust port 217*b* toward the connection portion of the catalyst converter 280. The branch exhaust pipe 273 connected to the exhaust port 217*b* (right connection port) bends more to the front side of the body or more to the rear side of the body than the branch exhaust pipe 272 to be formed into a pipe shape which slightly detours from the right exhaust port 217*b* to the connection portion of the catalyst converter 280. That is, the lengths of the exhaust paths from the exhaust ports 217*b*, 217*b* to the connection portion of the catalyst converter 280 are equal to each other.

The rear exhaust pipe 275 extends to the right side of the body from a portion which is at the right side of the catalyst converter 280 and different from the connection portion of the front exhaust pipe 271, and then bends to the rear side of the body to extend at the right side of the crankcase 214 toward the rear side of the body. The rear end of the rear exhaust pipe 275 is connected with the exhaust muffler 290 which functions as a silencer.

The catalyst converter 280 forms a part of the exhaust pipe 270. The axis L of the catalyst converter 280 is arranged to extend in the body width direction toward the crankshaft direction in the space Sp3 which is formed below the cylinder front surface 215A of the engine 211 and on a further forward side of the front surface of the crankcase 214. The catalyst converter 280 is arranged just below the cylinder front surface 215A in such a manner that the catalyst converter 280 stays substantially within the width of the cylinder 215 (the width of the engine 211). Specifically, in the side view of the body, the catalyst converter 280 is arranged in a space which is surrounded by the lower portion of the lower surface of the cylinder 215, the rear surface of the fuel tank 230, the front surface of the crankcase 214, and the horizontal plane Low (corresponding to the substantially lowest surface of the engine 211) which substantially horizontally extends from the bottom surface of the crankcase 214.

In the catalyst layout, because the catalyst converter 280 is arranged in the empty space Sp3 which is surrounded by the cylinder 215, the fuel tank 230 and the crankcase 214, the catalyst converter 280 can be compactly arranged by effectively using the empty space Sp3 and the layout efficiency can be improved. Moreover, because the catalyst converter 280 is arranged at the upper side of the horizontal plane Low which extends from the bottom surface of the crankcase 214, the catalyst converter 280 can be compactly arranged while the lowest ground clearance is ensured and the empty space Sp3 is effectively used.

Moreover, because the axis L of the catalyst converter 280 is arranged in such a manner that the axis L of the catalyst converter 280 is substantially perpendicular to the axis of the exhaust pipe 270 which extends in the body front-rear direction and connects the engine 211 with the exhaust muffler 290, the catalyst converter 280 which has a large capacity and a large longitudinal size can be compactly arranged within a short distance from the engine 211 to the exhaust muffler 290 as compared with the case where the catalyst converter 280 is arranged substantially in a same direction as the axis of the exhaust pipe 270.

Generally, in the case where multiple exhaust pipes which are connected to a multiple-cylinder engine are gathered before the multiple exhaust pipes reach an exhaust muffler, a sufficient space capacity is necessary at the exhaust pipe gathering part. In this embodiment, because the multiple branch exhaust pipes 272 and 273 which extend from the multiple-cylinder engine are connected to the catalyst converter 280 to be gathered, the space capacity of the exhaust pipe gathering part is sufficiently ensured.

Moreover, an oil filter 219, which is attached to a water-cooled oil cooler 220, is detachably arranged at the front surface side of the crankcase 214 of the engine 211 of this embodiment. The oil filter 219 protrudes more toward the front side of the body than the front surface of the crankcase 214. As shown in FIG. 4, the catalyst converter 280 is arranged at the upper side of the oil filter 219, so that the attachment and detachment operation of the oil filter 219 can be readily performed with the catalyst converter 280 being in attachment state.

Figure 6:
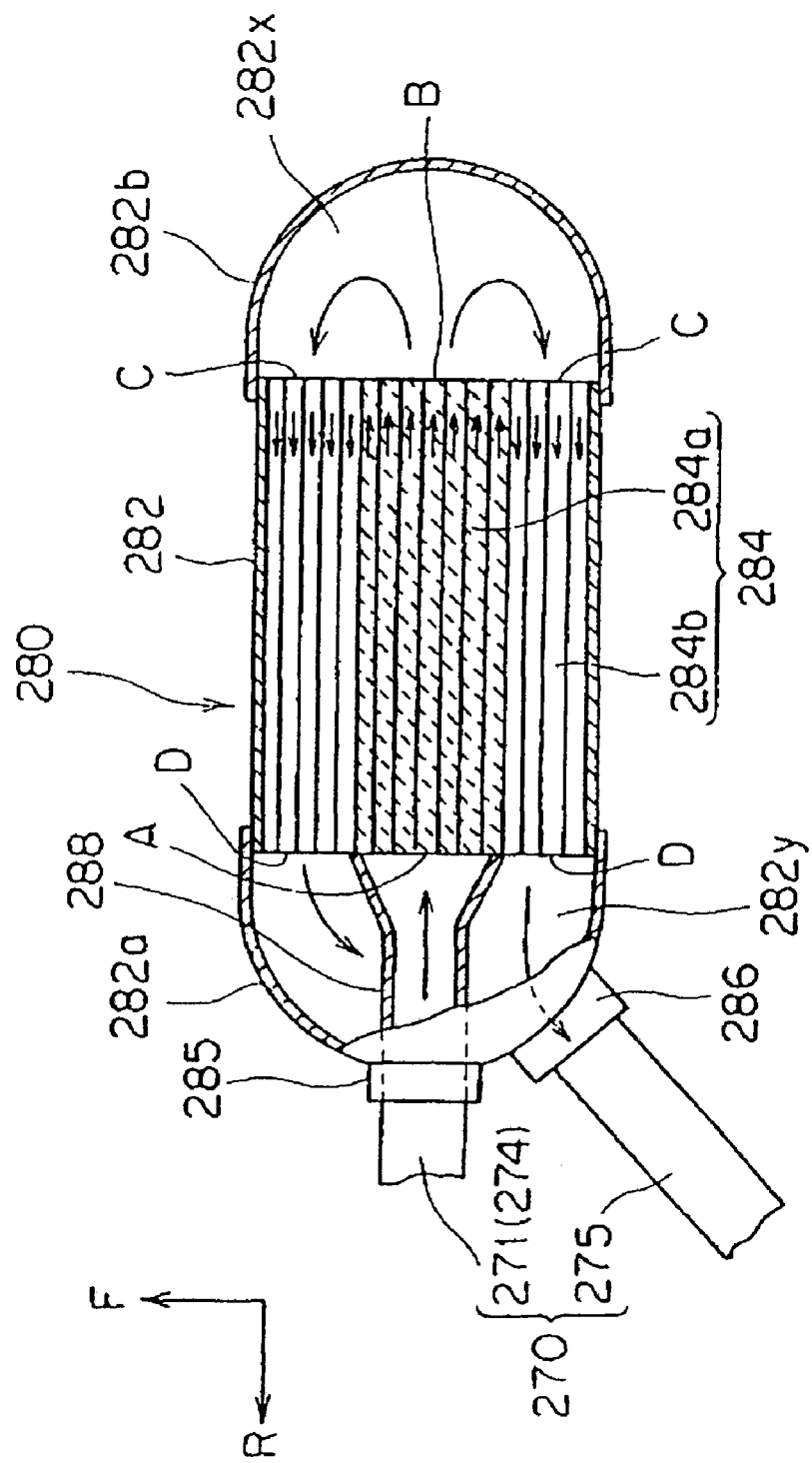
FIG. 6 is a view which shows an inner construction of a catalyst converter.

FIG. 6 shows an inner construction of the catalyst converter 280. As shown in FIG. 6, the catalyst converter 280 includes a converter body 282 which has a substantial cylinder shape and has two closed ends, and a catalyst body 284 which is formed in the converter body 282. A connection port 285 of the front exhaust pipe 271, which is an introduction pipe of exhaust gas, and a connection port 286 of the rear exhaust pipe 275, which is a discharge pipe of the exhaust gas having passed the catalyst 284, are arranged together at the side (right side of body) of one end 282*a* of the converter body 282 having a cylinder shape.

Figure 7:
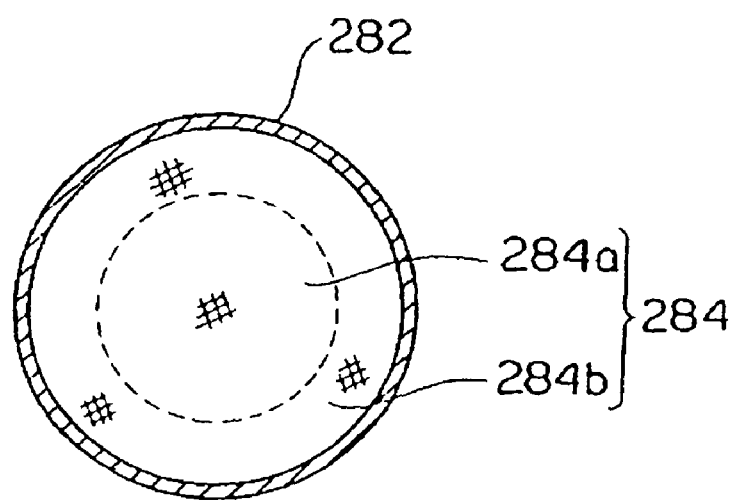
FIG. 7 is a cross sectional view of the catalyst converter.

The catalyst body 284 has a first catalyst chamber 284*a* (shown by hatching of broken line) which is communicated with the connection port 285 of the front exhaust pipe 271 through a communication pipe 288, and a second catalyst chamber 284*b* which is communicated with a connection port 286 of the rear exhaust pipe 275. As shown in FIG. 7, the cross section areas of the first catalyst chamber 284a and the second catalyst chamber 284b can be set to be substantially equal to each other, or the ratio thereof can be also arbitrarily changed according to an efficiency of a noise reduction. Moreover, the second catalyst chamber 284b can be also omitted. In this case, only the first catalyst chamber 284a is provided.

The first catalyst chamber 284a is positioned at the inner side of the catalyst body 284. As shown in FIG. 6, an inlet A of the first catalyst chamber 284a is communicated with the front exhaust pipe 271 through the communication pipe 288, and an outlet B of the first catalyst chamber 284a is communicated with an inversion chamber 282x of the side of other end 282b of the converter body 282.

The inversion chamber 282x communicates with an inlet C of the second catalyst chamber 284b which is arranged at the outer side of the catalyst 284. An outlet D of the inversion chamber 282x is communicated with a gather chamber 282y of the side of one end 282a of the converter body 282, and the rear exhaust pipe 275 communicates with the gather chamber 282y.

The catalyst body 284 is constructed of a porous honeycomb structure coated with platinum, palladium, rhodium, and the like. Thus, a honeycomb-type three-way catalyst is constructed. The exhaust gas which entered the inlet A of the first catalyst chamber 284a through the front exhaust pipe 271 and the communication pipe 288 having been described above reaches the inversion chamber 282x from the outlet B to enter the inlet C of the second catalyst chamber 284b from the inversion chamber 282x, after hydrocarbons, carbon monoxide and nitric oxide in the exhaust gas are removed by oxidization and reduction reactions. In the second catalyst chamber 284b, carbon hydride, carbon monoxide and nitric oxide in the exhaust gas are removed by oxidization and reduction reactions again. Then, the exhaust gas reaches the gather chamber 282y from the outlet D to be discharged from the rear exhaust pipe 275 to the exhaust muffler 290.

In the above-described construction, because all of the multiholes of the honeycomb penetrate from one end of the catalyst 284 through the other end thereof, a part of the multiholes functions as a porous communication pipe (the first catalyst chamber 284a) without change to shed the exhaust gas in one direction when the communication pipe 288 is connected with a part (central side) of one end of the catalyst 284. Moreover, the exhaust gas which is reversed at the inversion chamber 282x of the other end of the catalyst 284 flows in a contrary direction along another part of the multiholes of the honeycomb this time. That is, the one honeycomb catalyst body also functions as a two-direction communication pipe.

Moreover, because the catalyst body 284 is a honeycomb-type three-way catalyst which is originally constructed of a plurality of passages which are partitioned, a partition between the first catalyst chamber 284a and the second catalyst chamber 284b is unnecessary. Thus, the construction becomes simple. Moreover, because the catalyst body 284 is used by making the exhaust gas reciprocate in the passages of the single catalyst body 284, a purification having a good efficiency is available. Thus, activation can be readily performed.

Generally, the capacity of this three-way catalyst to react-purify hydrocarbons is low until the temperature of the three-way catalyst reaches the activation temperature (about 300° C.). When the temperature of the three-way catalyst reaches the activation temperature, this capacity becomes high.

In this embodiment, because the catalyst converter 280 is arranged within the width in the body width direction of the cylinder 215 of the engine 211, the catalyst converter 280 is arranged just below the cylinder front surface 215A, which becomes relatively hot in the engine 211, to efficiently receive the heat from the cylinder 215. Therefore, the temperature of the three-way catalyst readily reaches the activation temperature. Furthermore, in this embodiment, because the front exhaust pipe 271 which connects the cylinder 215 with the catalyst converter 280 is short, the temperature of the three-way catalyst is raised due to the exhaust gas of a high temperature. The temperature of the three-way catalyst is raised within an extremely short period and the three-way catalyst is rapidly activated, even in a cold engine condition after starting the engine, for example.

In this embodiment, because the catalyst converter 280 is provided at the halfway part of the exhaust pipe 270, it is unnecessary to arrange a catalyst of a large capacity in the exhaust muffler 290. Thus, the exhaust muffler 290 can be small-sized as compared with a vehicle having an engine of a large engine displacement where a catalyst of a large capacity is arranged in the exhaust muffler 290. Moreover, because the catalyst converter 280 is arranged to be substantially perpendicular to the extending direction of the exhaust pipe 270, the catalyst converter 280 can be simply and compactly arranged in a narrow space near the engine 211 while the capacity of the catalyst 284 of the catalyst converter 280 is sufficiently ensured, without enlarging the size of the front-rear direction of the motorcycle 10.

In this embodiment, as shown in FIG. 1, because the catalyst converter 280 is arranged in a so-called dead space which is positioned just below the front surface 215A of the forwardly tilted cylinder 215 of an engine 211 and at the front side of the crankcase 214, the space can be effectively used and the catalyst converter 280 can be arranged without enlarging the whole width of the vehicle. Moreover, because the catalyst converter 280 is arranged at the upper side of the lowest surface Low of the engine in the above-described space, the position of the center of gravity can be lowered and the gravity balance of the vehicle can be improved while the lowest gravity height is sufficiently ensured. Moreover, because the catalyst converter 280 is arranged in such a manner that the catalyst converter 280 is hidden, the degree of freedom in the body design can be ensured.

Furthermore, the catalyst converter 280 is arranged in the space which is at the rear surface side of a body component (fuel tank 230 and the like) and at the front side of the engine which easily becomes a dead space conventionally, so that this space can be effectively used. Moreover, cooling of the catalyst converter 280 due to traveling wind can be restricted by the body component on the front side of the catalyst converter 280, and the catalyst 284 in the catalyst converter 280 can be activated rapidly and stably.

Moreover, in this embodiment, the catalyst converter 280 also functions as a gathering portion for gathering the plurality of exhaust pipes (the branch exhaust pipes 272 and 273) which extend from the engine 211. Therefore, it is unnecessary to additionally provide an exhaust pipe gathering portion, so that the whole exhaust unit 260 can be compactly constructed. Furthermore, because the exhaust length of the exhaust gas can be ensured to be long by the part of the exhaust passage formed by the catalyst converter 280, the degree of freedom in layout of the exhaust muffler 290 can be also improved due to a shortening of the pipe length of the rear exhaust pipe 275, for example.

Figure 8:
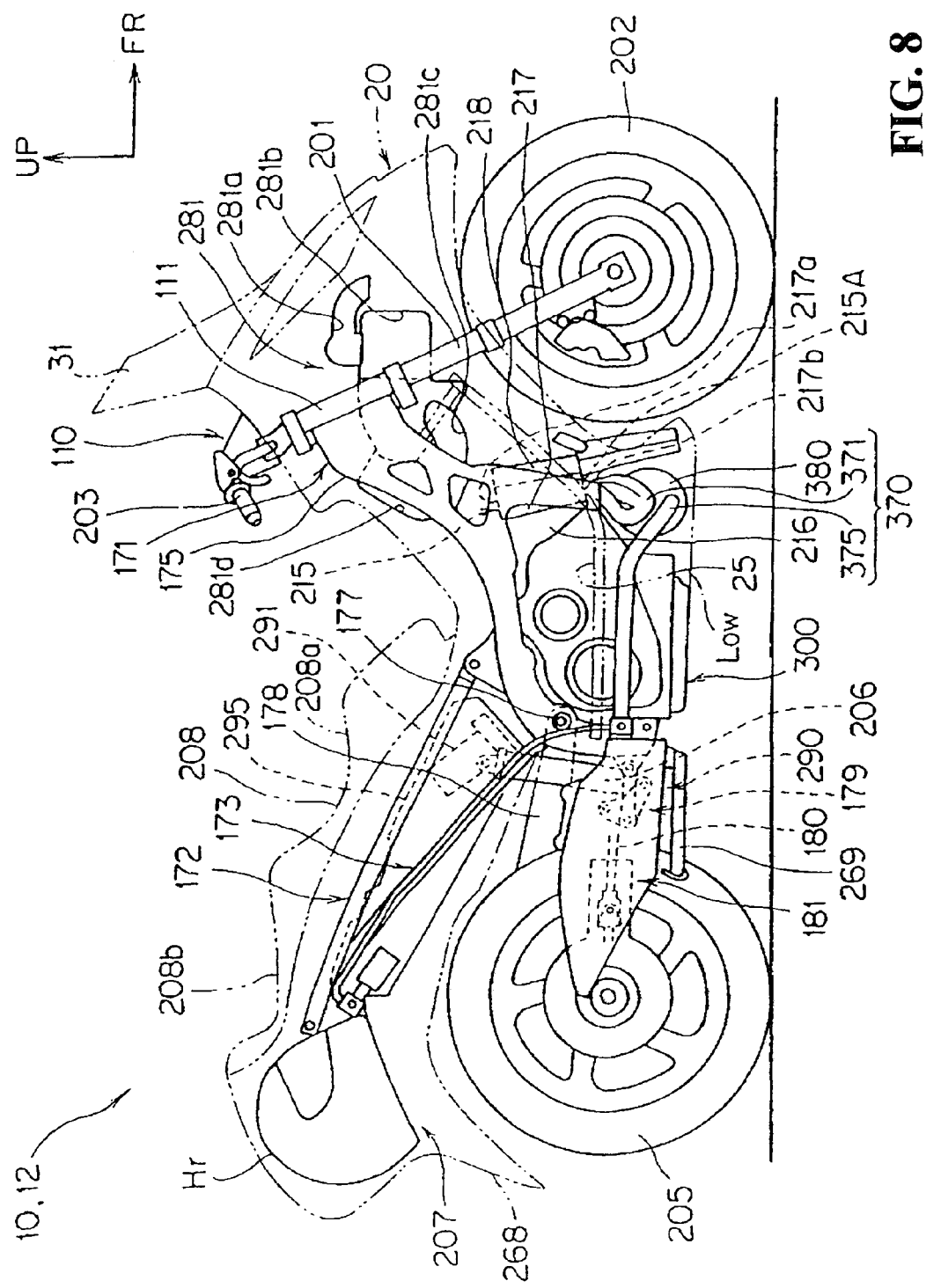
FIG. 8 is a side view of a motorcycle according to a second embodiment.
Figure 9:
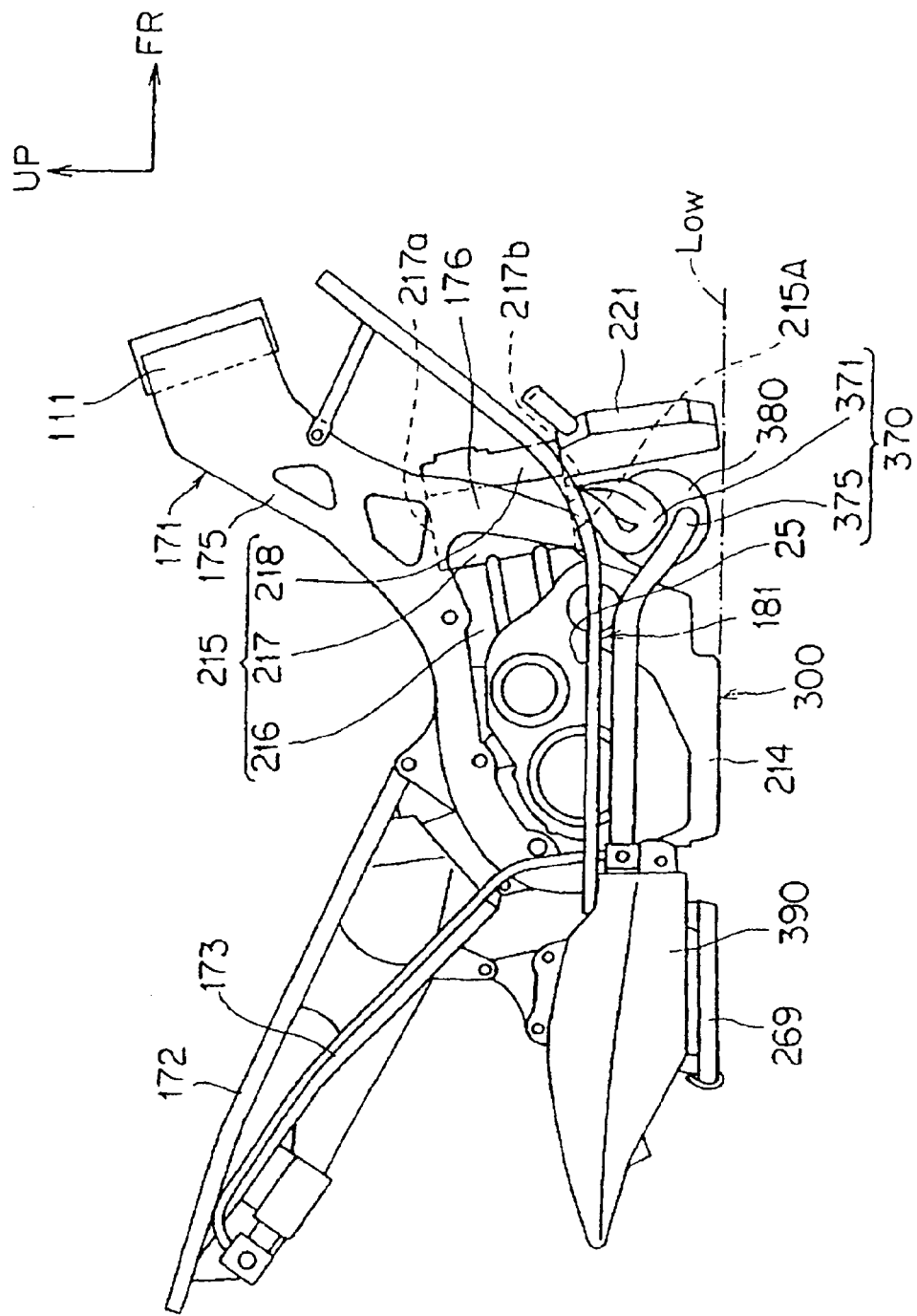
FIG. 9 is a view which shows a state where an engine is supported by a body frame.
Figure 10:
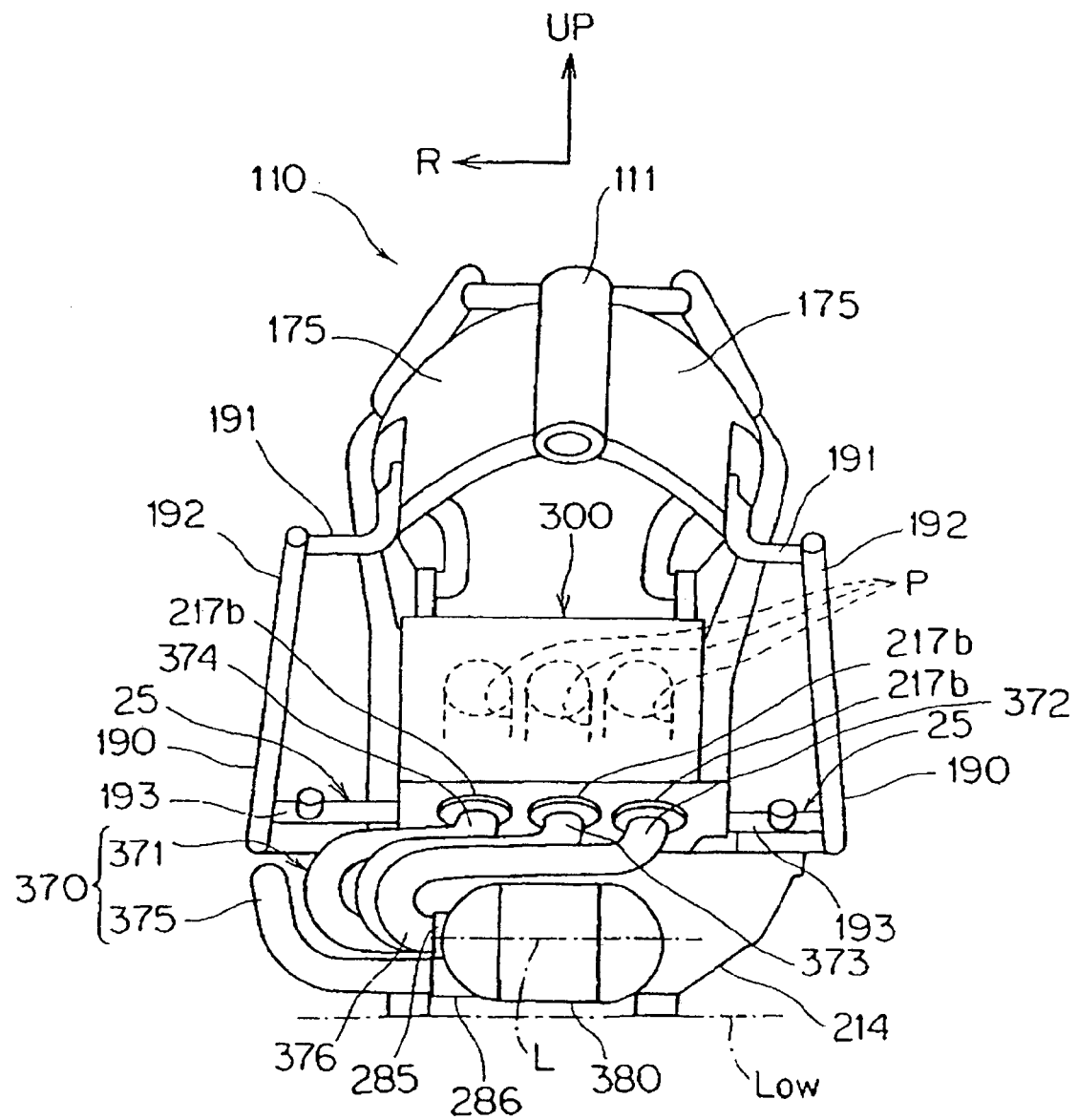
FIG. 10 is a front view which shows an engine along with a periphery construction thereof.

FIG. 8 is a side view of a motorcycle according to a second embodiment. FIG. 9 shows a state where an engine is supported at a body frame. FIG. 10 is a front view which shows the engine along with the periphery construction thereof. In this embodiment, a mode where a catalyst converter 380 which has a noise reduction construction is arranged in a motorcycle 10 where a parallel three-cylinder engine 300 is mounted will be described. Hereinafter, the substantially same construction with the above-described motorcycle 10 is provided with a same reference numerals to be shown, and the specific description thereof is omitted.

As shown in FIGS. 8 and 9, the motorcycle 10 is a vehicle having the low-floor type floors 25 which are arranged at the left side and right side of the body frame 110 and horizontally extend to the rear side after extending downward to the rear from the front portion of the body. Moreover, the body frame 110 is covered by the body cover 20, and the engine 300 is mounted between the right and left low-floor type floors 25.

The body frame 110 of the motorcycle 10 has a pair of right and left main frames 171 which are connected with the head pipe 111 and extend to the rear side of the body, rear frames 172, 172 (seat rails) which extend upward to the rear from the rear portions of the main frames 171, 171, and support frames 173, 173 which extend upward to the rear from the rear portions of the main frames 171, 171 at the lower side of the rear frames 172, 172 to support the rear frames 172, 172 from the lower side.

The main frames 171, 171 are constructed by integrally forming aluminum metal material or the like into a pair of right and left upper members 175, 175 which are connected with the head pipe 111 and extend downward to the rear and a pair of right and left lower members 176, 176 which branch from the front portions of the upper members 175, 175 and extend downwards. The engine 300 is supported in the space which is surrounded by the upper members 175, 175 and the lower members 176, 176.

At the rear ends of the upper members 175, 175, a rear swing arm 178 is supported swingably in the up-down direction through a pivot shaft 177. The rear wheel 205 is journaled to the rear end of the rear swing arm 178, and the rear cushion unit 206, which is supported by the body frame 110, is connected with the rear swing arm 178 through a link mechanism 179.

Moreover, as shown in FIG. 10, floor brackets 190, 190 which support the low-floor type floors 25 are provided with front sub-pipes 191, 191 which extend laterally and obliquely downward from the upper members 175, 175, main pipes 192, 192 which extend obliquely downward and rearward from the front sub-pipes 191, 191, and rear sub-pipes 193, 193 which connect the rear end portions of the main pipes 192, 192 with the rear portions of the upper members 175, to support the floors 25 at the main pipes 192.

Moreover, the motorcycle 10 has a power transmission mechanism 181 which transmits the driving to the rear wheel 205 from the engine 300 through, for example, a drive shaft 180. The motorcycle 10 also has the pair of right and left front forks 201 which are rotatably supported at the head pipe 111 to support the front wheel 202, the handlebar 203 for steering, the seat 208 which is supported at the rear frames 172, 172, and the storage box 207 which is attached to the rear portion of the rear frames 172, 172.

As shown in FIG. 9, the engine 300 has the crankcase 214 and the cylinder 215 which extends from the upper portion of the crankcase 214 to the front side. The forwardly tilted cylinder 215 has the cylinder block 216, the cylinder head 217 and the head cover 218. The engine 300 is, for example, a water-cooled parallel three-cylinder engine (parallel multiple-cylinder engine) where three pistons P are housed slidably in the substantial front-rear direction in the cylinder block 216. In the engine 300, the crankshaft CR is also journaled in such a manner that the crankshaft CR extends in the engine width direction in the crankcase 214. The rotation of the crankshaft CR is transmitted to the drive shaft 180 through a gear changing mechanism (not shown) in the crankcase 214, so that the rear wheel 205 is driven to rotate.

A fuel tank 295 is arranged between the rear side of the engine 300 and the seat 208. The throttle body 283 (not shown) and the air cleaner 281, which form the air suction system of the engine 300, are arranged at the upper side of the cylinder 215 of the engine 300. The air cleaner 281 is connected to the air suction port 217a (not shown) of the upper surface of the cylinder head 217 of the engine 211 through the throttle body 283 (not shown).

The air cleaner 281 has an air intake duct 281a which is arranged at the front side of the head pipe 111, a first air chamber 281b which is arranged at the lower side of the air intake duct 281a, and a second air chamber 281d which is arranged at the rear side of the first air chamber 281b through a connection duct 281c. Thus, firstly, air having been introduced through the air intake duct 281a is cleaned by an element which is provided in the first air chamber 281b and not shown. Then, air passes the connection duct 281c to enter the air cleaner 281d. Finally, air having been cleaned is supplied to the engine 300 from the second air chamber 281d. The radiator 221 is arranged between the cylinder 215 and the front wheel 202. In drawings, the reference numeral 291 is a fuel pump.

Next, an exhaust unit 320 of the engine 300 will be described.

As shown in FIG. 10, the exhaust unit 320 has an exhaust pipe 370, the catalyst converter 380 (catalyst storage chamber) and an exhaust muffler 390. The exhaust pipe 370 has, below the cylinder front surface 215A of the engine 300 and on the front side of the crankcase 214, a front exhaust pipe 371 which extends from exhaust ports 217b of the cylinder 215 to be connected with a catalyst converter 380, and a rear exhaust pipe 375 which extends from the catalyst converter 380 to the rear side of the body to be connected with the exhaust muffler 390. The upstream side (exhaust inlet side) of the front exhaust pipe 371 branches into branch exhaust pipes 372, 373 and 374 with the number which is equal to that of the exhaust ports 217b. The front exhaust pipe 371 is a metal pipe where the downstream sides (exhaust outlet sides) of the branch exhaust pipes 372, 373 and 374 are gathered into one piece. The branch exhaust pipes 372, 373 and 374 sandwich a gasket which is not shown therebetween, and are respectively connected with the exhaust ports 217b, 217b, 217b of the cylinder head 217.

The branch exhaust pipes 372, 373, and 374 become one exhaust pipe, after the branch exhaust pipes 372, 373, and 374 bend to the right side of the body while extending to the lower side from the exhaust ports 217b, 217b, 217b. The one exhaust pipe 376 bends toward the body width middle to be connected to the connection port 285 which is arranged at the right end 282a of the catalyst converter 380. As shown in FIG. 10, the branch exhaust pipe 372 which is connected to the exhaust port 217b (left exhaust port) which is furthest from the connection portion (right side) of the catalyst converter 380 among the branch exhaust pipes 372, 373 and 374 is formed to have a substantially shortest path from the exhaust port 217b toward the connection portion. The branch exhaust pipe 373 which is connected to the middle exhaust port 217b is formed into a shape which bends further to the rear side of the body as compared with the branch exhaust pipe 372, to slightly detour. The branch exhaust pipe 374 which is connected to the nearest exhaust port 217b detours more than the branch exhaust pipe 373. That is, all of the exhaust path lengths from the exhaust ports 217b, 217b, 217b to the connection portion of the catalyst converter 380 are constructed to be equal to each other.

The rear exhaust pipe 375 is connected to the exhaust muffler 390 at a position which is different from the connection position of the front exhaust pipe 371 and at the right side of the catalyst converter 380. Specifically, after the rear exhaust pipe 375 extends from the connection port 286 of the right end 282a to the right side of the body, the rear exhaust pipe 375 bends to the rear side of the body to extend at the right side of the crankcase 214 to the rear side of the body and the rear end of the rear exhaust pipe 375 is connected with the exhaust muffler 390 which functions as a silencer.

The catalyst converter 380 forms a part of the exhaust pipe 370, and is arranged in the space which is formed at the lower side of the cylinder front surface 215A of the engine 300 and at a front side of the front surface of the crankcase 214, in such a manner that the axis L of the catalyst converter 380 extends in the body width direction toward the crankshaft direction. The catalyst converter 380 is arranged in such a manner that the catalyst converter 380 is positioned substantially within the width of the cylinder 215 (within the width of the engine 300) just below the cylinder 215. More specifically, the catalyst converter 380 is arranged in the space which is surrounded by the lower side of the lower surface of the cylinder 215, the rear surface of the radiator 221, the front surface of the crankcase 214, and the horizontal plane Low (corresponding to the substantially lowest surface of the engine) which substantially horizontally extends from the bottom surface of the crankcase 214, in a side view of the body.

Figure 11:
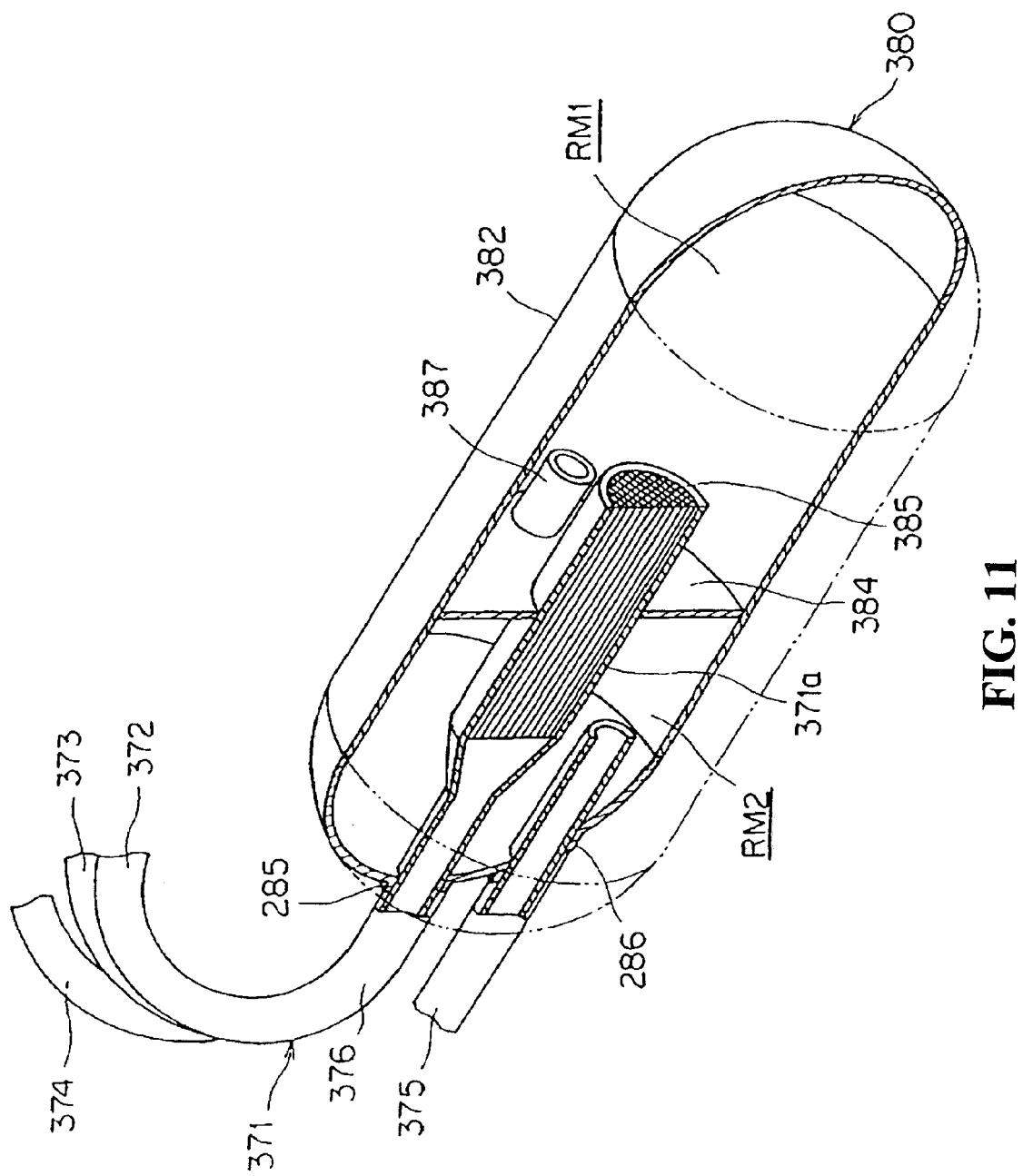
FIG. 11 is a view which shows an inner construction of a catalyst converter.

FIG. 11 shows an inner construction of the catalyst converter 380. As shown in FIG. 11, the catalyst converter 380 has a converter body 382 which has two closed ends and a substantial cylinder shape, and a partition wall 384 which partitions the interior of the converter body 382 into multiple chambers RM1 and RM2 (two expansion chambers in this example). The front exhaust pipe 371 is enlarged in its diameter after entering the converter body 383 from the right side of the converter body 382, and a catalyst 385 is arranged in a diameter-enlarged pipe 371a (first communication pipe).

The diameter-enlarged pipe 371a extends in the axis direction of the converter body 382 to penetrate the partition wall 384, and forms a cylinder-shaped member in which the catalyst 385 having a sufficient size corresponding to the engine displacement can be arranged to communicate with the left side chamber RM1 which constructs a first expansion chamber of the converter body 382.

Moreover, a communication pipe 387 (second communication pipe) penetrates the partition wall 384 in an area separate from the diameter enlarged pipe 371a. The communication pipe 387 allows the left side chamber RM1 to communicate with the right side chamber RM2, which constructs the second expansion chamber. The inlet of the rear exhaust pipe 375 is opened in the right side chamber RM2.

The catalyst 385 is a three-way catalyst of a honeycomb type. Each gas exhausted from the above-described three-cylinder engine passes into the front exhaust pipe 371 and the diameter-enlarged pipe 371a to be gathered. The gathered exhaust gas passes the catalyst 385, so that hydrocarbons, carbon monoxide and nitric oxide in the exhaust gas are removed by oxidization and reduction reactions. Then, the exhaust gas having passed through the catalyst body 385 reaches the left side chamber RM1. In the left side chamber RM1, the direction of the exhaust gas is inverted along the wall of the left side chamber RM1 (first expansion chamber). Subsequently, the exhaust gas passes through the communication pipe 387 (second communication pipe) to flow to the right side chamber RM2 (second expansion chamber), and is exhausted to the exhaust muffler 390 from the rear exhaust pipe 376.

In the above-described construction, when the exhaust gas having passed the catalyst body 385 enters the left side chamber RM1 which has a large space capacity, the exhaust gas expands in the left side chamber RM1. Sequentially, the exhaust gas also expands when the exhaust gas passes through the communication pipe 387 (second communication pipe) to enter the right side chamber RM2 (second expansion chamber) which has a large space capacity. Then, the exhaust gas is exhausted to the exhaust muffler 390 after the exhaust gas is depressurized by the multi-stage expansion.

Therefore, the catalyst converter 380 also functions as a silencer. The muffler capacity can be ensured to be large by the catalyst converter 390 and the exhaust muffler 390 of the vehicle rear side, so that the exhaust sound can be sufficiently reduced. Thus, the exhaust muffler of the vehicle rear side can be formed in a compact size due to the capacity of the catalyst converter 380. The whole exhaust unit 320 can be constructed more compactly, so that the degree of freedom in layout of the exhaust muffler can be improved.

In this embodiment, because the catalyst converter 380 which has the sound reduction structure in the exhaust pipe 370 is provided, it is unnecessary to arrange a catalyst with a large capacity in the exhaust muffler 390. Thus, the exhaust muffler 390 can be small-sized. Moreover, in this embodiment, similarly to the first embodiment, the catalyst converter 380 is arranged just below the cylinder front surface 215A of the engine 300 which is constructed at the forwardly tilted cylinder 215 and at the upper side of the lowest surface Low of the engine in the front-rear space between the body component (radiator 221 or the like) of the front side of the engine and the crankcase 214, so that the catalyst converter 380 can be simply and compactly arranged in a narrow space near the engine 300. Moreover, the position of the center of gravity can be lowered while the lowest ground clearance is sufficiently ensured, and the weight balance of the vehicle can be improved.

Figure 12:
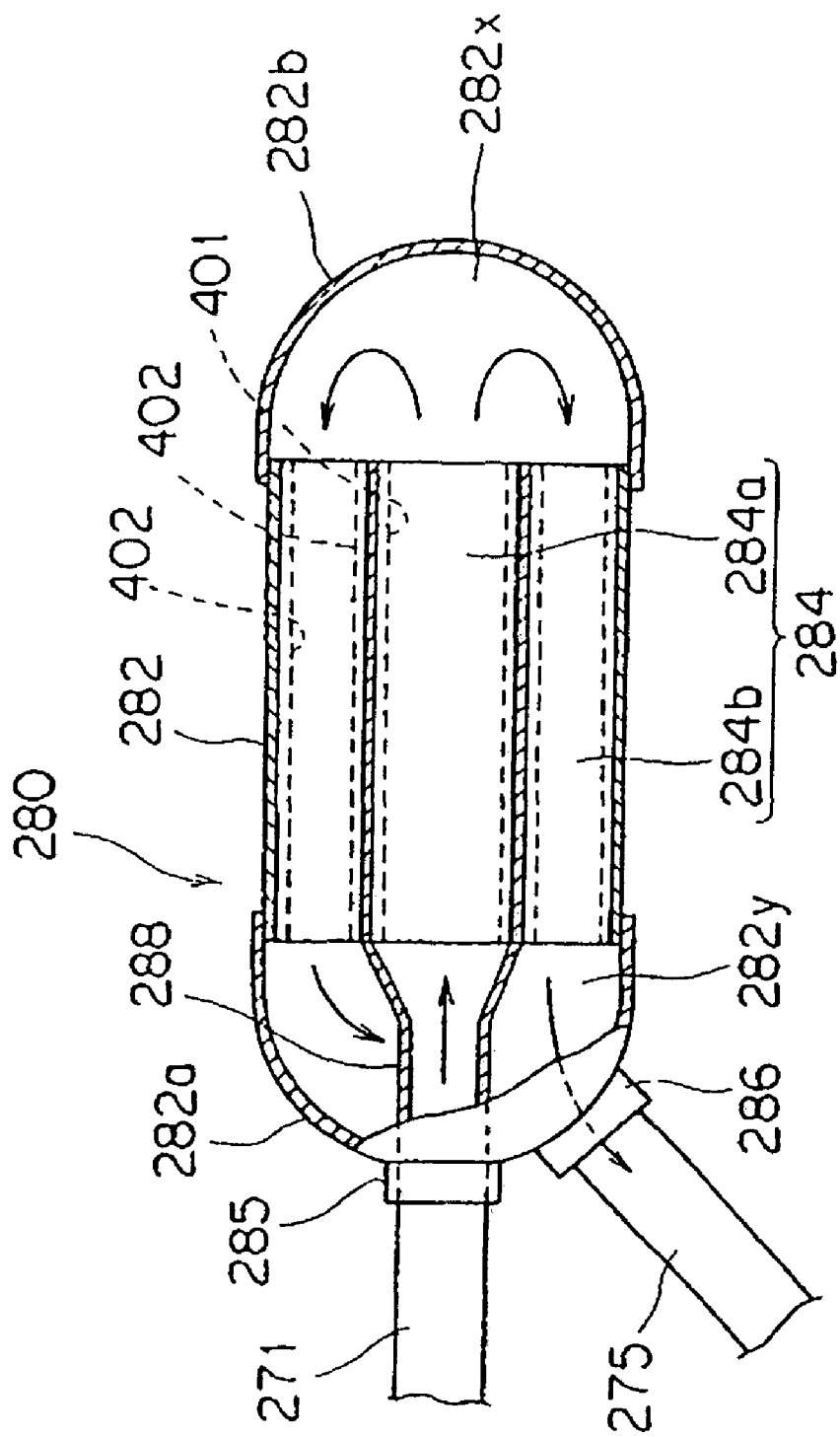
FIG. 12 is a view which shows an inner construction of a catalyst converter according to a modification example.

Hereinbefore, the present invention has been described based on two embodiments. However, the present invention is not limited to that. Various modifications can be performed. For example, in the above-described embodiments, instead of the honeycomb three-way catalyst, a heat tube where platinum, palladium, rhodium and the like are supported in a punching pipe can be also suitably used. Specifically, as shown in FIG. 12, in the converter body 282 of the catalyst converter 280, a first punching pipe 401, which is disposed along the inner circumference wall of the body, and a second punching pipe 402, which is disposed at the outer circumference of the first punching pipe 401, are arranged. Platinum, palladium, rhodium and the like can be also supported in the punching pipes 401 and 402. In this case, the space where the first punching pipe 401 extends forms the first catalyst chamber 284a, and the space where the second punching pipe 402 extends forms the second catalyst chamber 284b. Hydrocarbons, carbon monoxide, nitric oxide and the like in the exhaust gas having entered the catalyst chambers 284a and 284b are removed by oxidization and reduction reactions.

Furthermore, in the above-described embodiments, the case where the present invention is suitably used in the catalyst arrangement construction of the motorcycle where a multiple-cylinder engine is mounted has been described. However, the present invention is not limited to this case. The present invention can be also suitably used in the catalyst arrangement construction of the motorcycle where a single-cylinder engine is mounted.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A vehicle, comprising:
an engine including a crankshaft, a crankcase, and a cylinder which extends from an upper portion of said crankcase toward a front side of said vehicle, and
a catalytic converter in an exhaust pipe between an exhaust port of said engine and an exhaust muffler of said engine,
wherein said catalytic converter is disposed in a space which is defined by an upper side of a horizontal plane which substantially horizontally extends from a bottom surface of said crankcase, a lower side of a front surface of said cylinder of said engine, and a front side of a front surface of said crankcase,
wherein a fuel tank is disposed at a front side of said cylinder,
wherein said space in which said catalytic converter is disposed is further defined by a rear surface of said fuel tank, and
wherein an axis of said catalytic converter is parallel to an axis of said crankshaft.

2. The vehicle according to claim 1,
wherein said engine is a parallel multiple-cylinder engine; and
wherein said catalytic converter is arranged within the width of said multi-cylinder engine in a vehicle width direction.

3. The vehicle according to claim 2, wherein a plurality of exhaust pipes which are connected to said multi-cylinder engine extend to a lower side of a body of said vehicle, and are combined into a single pipe which connects to said catalytic converter.

4. The vehicle according to claim 1, further comprising:
a partition wall for partitioning an interior of said catalytic converter into a plurality of expansion chambers; and
a plurality of communication pipes which penetrate said partition wall,
wherein a catalyst is disposed in one of said communication pipes.

5. The vehicle according to claim 2, further comprising:
a partition wall for partitioning an interior of said catalytic converter into a plurality of expansion chambers; and
a plurality of communication pipes which penetrate said partition wall,
wherein a catalyst is disposed in one of said communication pipes.

6. The vehicle according to claim 3, further comprising:
a partition wall for partitioning an interior of said catalytic converter into a plurality of expansion chambers; and
a plurality of communication pipes which penetrate said partition wall,
wherein a catalyst is disposed in one of said communication pipes.

7. The vehicle according to claim 1, further comprising:
a detachable oil filter which is disposed on a front side of said crankcase,
wherein said catalytic converter is disposed on an upper side of said oil filter.

8. The vehicle according to claim 2, further comprising:
a detachable oil filter which is disposed on a front side of said crankcase,
wherein said catalytic converter is disposed on an upper side of said oil filter.

9. The vehicle according to claim 3, further comprising:
a detachable oil filter which is disposed on a front side of said crankcase,
wherein said catalytic converter is disposed on an upper side of said oil filter.

10. The vehicle according to claim 4, further comprising:
a detachable oil filter which is disposed on a front side of said crankcase,
wherein said catalytic converter is disposed on an upper side of said oil filter.

11. The vehicle according to claim 5, further comprising:
a detachable oil filter which is disposed on a front side of said crankcase,
wherein said catalytic converter is disposed on an upper side of said oil filter.

12. The vehicle according to claim 6, further comprising:
a detachable oil filter which is disposed on a front side of said crankcase,
wherein said catalytic converter is disposed on an upper side of said oil filter.

* * * * *